(12) United States Patent
Verdejo et al.

(10) Patent No.: US 8,612,124 B2
(45) Date of Patent: Dec. 17, 2013

(54) VARIABLE VALVE LIFT MECHANISM FAULT DETECTION SYSTEMS AND METHODS

(75) Inventors: Julian R. Verdejo, Farmington, MI (US); Kenneth J. Buslepp, Brighton, MI (US); Nicholas John Kalweit, Novi, MI (US)

(73) Assignee: GM Global Technology Operations LLC

( * ) Notice: Subject to any disclaimer, the term of this patent is extended or adjusted under 35 U.S.C. 154(b) by 385 days.

(21) Appl. No.: 13/024,726

(22) Filed: Feb. 10, 2011

(65) Prior Publication Data

US 2012/0209494 A1 Aug. 16, 2012

(51) Int. Cl.
*F02D 13/02* (2006.01)
*F02D 13/00* (2006.01)

(52) U.S. Cl.
USPC ........................................ 701/114; 123/90.15

(58) Field of Classification Search
USPC .................. 701/102, 107, 110, 114; 123/435, 123/345–348, 90.15–90.18, 90.12, 90.11, 123/90.31; 73/114.17, 114.16
See application file for complete search history.

(56) References Cited

U.S. PATENT DOCUMENTS

| | | | |
|---|---|---|---|
| 3,923,021 A | 12/1975 | Stark | |
| 4,525,781 A * | 6/1985 | Konomi et al. ................. | 701/99 |
| 4,788,942 A | 12/1988 | Pouring et al. | |
| 5,046,468 A | 9/1991 | Erhard | |
| 5,699,253 A | 12/1997 | Puskorius et al. | |
| 5,715,794 A | 2/1998 | Nakamura et al. | |
| 5,732,382 A | 3/1998 | Puskorius et al. | |
| 5,771,482 A | 6/1998 | Rizzoni | |
| 6,085,143 A | 7/2000 | Przymusinski et al. | |
| 6,752,009 B2 | 6/2004 | Minich et al. | |
| 6,758,179 B1 * | 7/2004 | McKay et al. ............. | 123/90.17 |
| 6,866,024 B2 | 3/2005 | Rizzoni et al. | |
| 7,047,125 B1 | 5/2006 | He et al. | |
| 7,063,057 B1 * | 6/2006 | Waters et al. ............. | 123/90.16 |
| 7,117,080 B2 | 10/2006 | Sobel | |
| 7,325,446 B1 | 2/2008 | Assaf et al. | |
| 7,353,803 B2 | 4/2008 | Mathews et al. | |
| 7,437,233 B2 * | 10/2008 | Yasui et al. ................... | 701/102 |
| 7,500,470 B2 | 3/2009 | Buslepp et al. | |

(Continued)

FOREIGN PATENT DOCUMENTS

| | | |
|---|---|---|
| CN | 1204003 A | 1/1999 |
| CN | 101331305 A | 12/2008 |
| JP | 2009174397 A | 8/2009 |

OTHER PUBLICATIONS

U.S. Appl. No. 13/590,251, Brian E. Betz.

(Continued)

*Primary Examiner* — Mahmoud Gimie

(57) ABSTRACT

A system for a vehicle includes a filtering module, an indicated mean effective pressure (IMEP) determination module, and a stuck mechanism indicator module. The filtering module generates engine speeds based on positions of teeth of a toothed wheel that rotates with a crankshaft and based on a crankshaft position signal generated by a crankshaft position sensor. The IMEP determination module determines an IMEP for a combustion cycle of a cylinder of an engine based on squares of first and second ones of the engine speeds during the combustion cycle. The stuck mechanism indicator module selectively diagnoses a fault in a variable valve lift (VVL) mechanism of the cylinder based on the IMEP.

20 Claims, 9 Drawing Sheets

(56) References Cited

U.S. PATENT DOCUMENTS

| | | |
|---|---|---|
| 7,530,261 B2 | 5/2009 | Walters |
| 7,607,415 B2 | 10/2009 | Mathews et al. |
| 7,654,248 B2 | 2/2010 | Buslepp et al. |
| 8,027,782 B2 | 9/2011 | Assaf et al. |
| 2006/0112933 A1* | 6/2006 | Yasui et al. ............... 123/406.41 |
| 2006/0254560 A1* | 11/2006 | Mann et al. ................... 123/305 |
| 2007/0295290 A1* | 12/2007 | Cao ................................. 123/64 |
| 2010/0083936 A1 | 4/2010 | Verdejo |
| 2011/0253100 A1 | 10/2011 | Kaiser et al. |
| 2012/0209494 A1 | 8/2012 | Verdejo et al. |

OTHER PUBLICATIONS

U.S. Appl. No. 13/590,369, Brian E. Betz.
U.S. Appl. No. 12/762,523, Mathews.
U.S. Appl. No. 12/984,818, Verdejo.
U.S. Appl. No. 12/357,776, filed Jan. 22, 2009, Verdejo et al.
U.S. Appl. No. 12/478,159, filed Jun. 4, 2009, Verdejo et al.
U.S. Appl. No. 12/762,516, filed Apr. 19, 2010, Kaiser et al.
Chinese Search Report dated Sep. 27, 2012 for Chinese Application No. CN201110097845.3, (2 pages).

* cited by examiner

VARIABLE VALVE LIFT MECHANISM FAULT DETECTION SYSTEMS AND METHODS

FIELD

The present disclosure relates to internal combustion engines and more particularly to variable valve lift mechanisms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. More specifically, an intake valve is selectively opened to draw air into a cylinder of the engine. The air mixes with fuel to form an air/fuel mixture that is combusted within the cylinder. The air/fuel mixture is compressed and combusted to drive a piston within the cylinder. An exhaust valve selectively opens to allow the exhaust gas resulting from combustion to exit the cylinder.

A rotating camshaft regulates the opening and closing of the intake and/or exhaust valves. The camshaft includes cam lobes that are fixed to and rotate with the camshaft. The geometric profile of a cam lobe determines a valve lift schedule. More specifically, the geometric profile of a cam lobe generally controls the period that the valve is open (duration) and the magnitude or degree to which the valve opens (lift).

Variable valve actuation (VVA), also called variable valve lift (VVL) improves fuel economy, engine efficiency, and/or performance by modifying valve lift and duration as a function of engine operating conditions. Two-step VVA systems include VVL mechanisms, such as hydraulically-controlled, switchable roller finger followers (SRFFs). A SRFF associated with a valve (e.g., the intake or exhaust valves) allows the valve to be lifted in two discrete modes: a low lift mode and a high lift mode. Generally, the valve lift associated with the high lift mode is greater than the valve lift associated with the low lift mode.

SUMMARY

A system for a vehicle includes a filtering module, an indicated mean effective pressure (IMEP) determination module, and a stuck mechanism indicator module. The filtering module generates engine speeds based on positions of teeth of a toothed wheel that rotates with a crankshaft and based on a crankshaft position signal generated by a crankshaft position sensor. The IMEP determination module determines an IMEP for a combustion cycle of a cylinder of an engine based on squares of first and second ones of the engine speeds during the combustion cycle. The stuck mechanism indicator module selectively diagnoses a fault in a variable valve lift (VVL) mechanism of the cylinder based on the IMEP.

A method for a vehicle includes: generating engine speeds based on positions of teeth of a toothed wheel that rotates with a crankshaft and based on a crankshaft position signal generated by a crankshaft position sensor; determining an indicated mean effective pressure (IMEP) for a combustion cycle of a cylinder of an engine based on squares of first and second ones of the engine speeds during the combustion cycle; and selectively diagnosing a fault in a variable valve lift (VVL) mechanism of the cylinder based on the IMEP.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
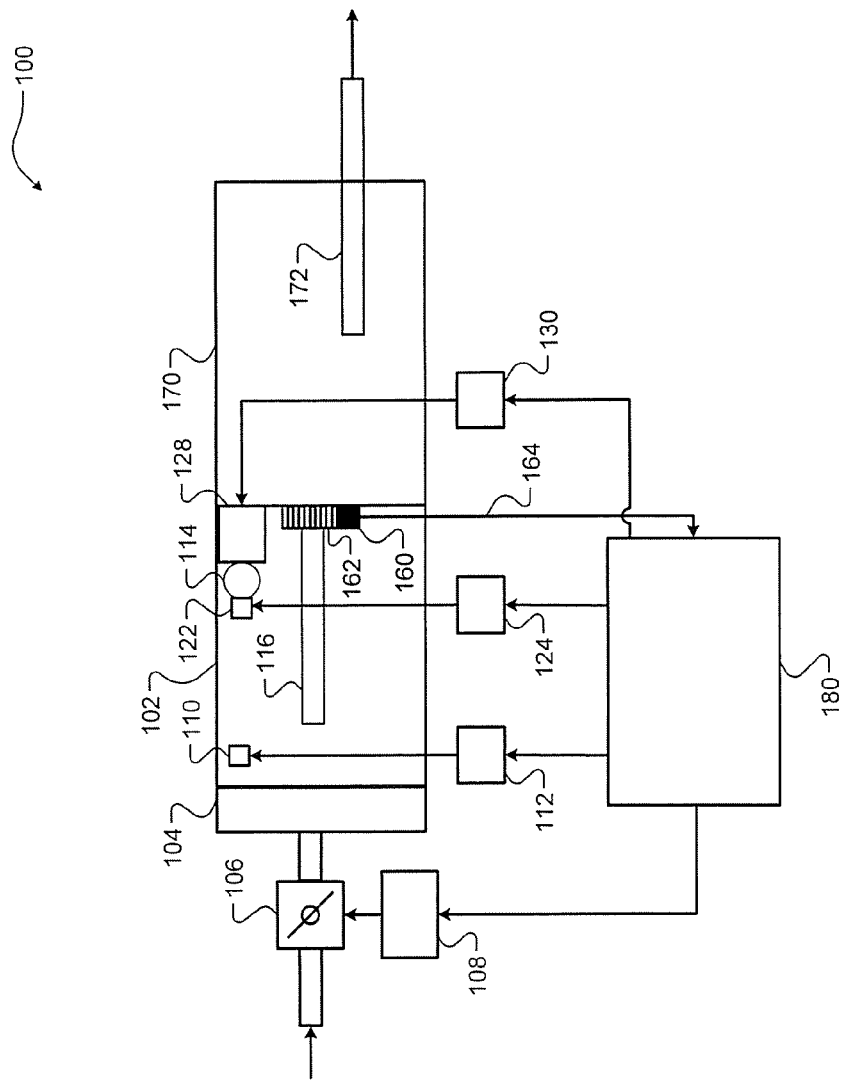
FIG. 1A is a functional block diagram of an example control system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A crankshaft position sensor generates pulses as teeth of an N-toothed wheel pass the crankshaft position sensor. The N-toothed wheel rotates with a crankshaft of the engine. A control module, such as an engine control module (ECM), receives the pulses and determines a rotational speed of the crankshaft based on the period between two pulses and the rotational distance between the teeth associated with the two pulses.

The N-toothed wheel may have space for, for example, 60 equally spaced teeth (i.e., N=60). The N-toothed wheel may include 58 teeth that are approximately equally spaced and a gap where 2 approximately equally spaced teeth are missing. Accordingly, a given point (e.g., an edge) of each of the teeth (including the missing teeth) may be separated by a rotational distance of approximately 6° (360°/60=6°). However, the rotational distance between consecutive teeth may vary. In other words, variation in the rotational distance between the given point of two consecutive teeth may exist. The variation may be due to, for example, manufacturing tolerances, part-to-part variation, wear, and/or one or more other sources.

The ECM selectively learns the rotational distance between each pair of consecutive teeth of the N-toothed wheel. Based on the learned distances and the period between pulses in the crankshaft position signal, the control module generates an engine speed signal. The ECM also applies a filter to the engine speed signal. The engine speed signal corresponds to the instantaneous engine speed at a given crankshaft position.

The ECM determines an indicated work for a combustion cycle of a cylinder based on squares of two or more instantaneous engine speeds at predetermined crankshaft positions of the combustion cycle. The ECM determines an indicated mean effective pressure (IMEP) for the combustion cycle of the cylinder based on the indicated work. The ECM determines a coefficient of variation (COV) for the cylinder based on a predetermined number of the IMEPs determined for the predetermined number of combustion cycles of the cylinder.

The ECM controls operation of a variable valve lift mechanism (VVL) associated with the cylinder. The ECM selectively commands a transition in operation of the VVL mechanism between low and high lift modes. When operating in the low lift mode, the VVL mechanism controls opening and closing of an associated valve based on a geometric profile of a low lift cam lobe that rotates with a camshaft. When operating in the high lift mode, the VVL mechanism controls the opening and closing of the valve based on a geometric profile of a high lift cam lobe that rotates with the camshaft. The ECM of the present disclosure selectively diagnoses that the VVL mechanism is stuck in the low lift mode or the high lift mode based on whether the COV changes by at least a predetermined amount or percentage after a transition is commanded.

Referring now to FIG. 1A, a functional block diagram of an example vehicle system 100 is presented. An engine 102 generates torque for a vehicle. Air is drawn into the engine 102 through an intake manifold 104. Airflow into the intake manifold 104 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injector(s).

A cylinder 114 includes a piston (not shown) that is coupled to a crankshaft 116. Although the engine 102 is depicted as including only the cylinder 114, the engine 102 may include more than one cylinder. One combustion cycle of the cylinder 114 may include four strokes: an intake stroke, a compression stroke, an expansion stroke, and an exhaust stroke. One engine cycle includes each of the cylinders undergoing one combustion cycle.

Figure 1B:
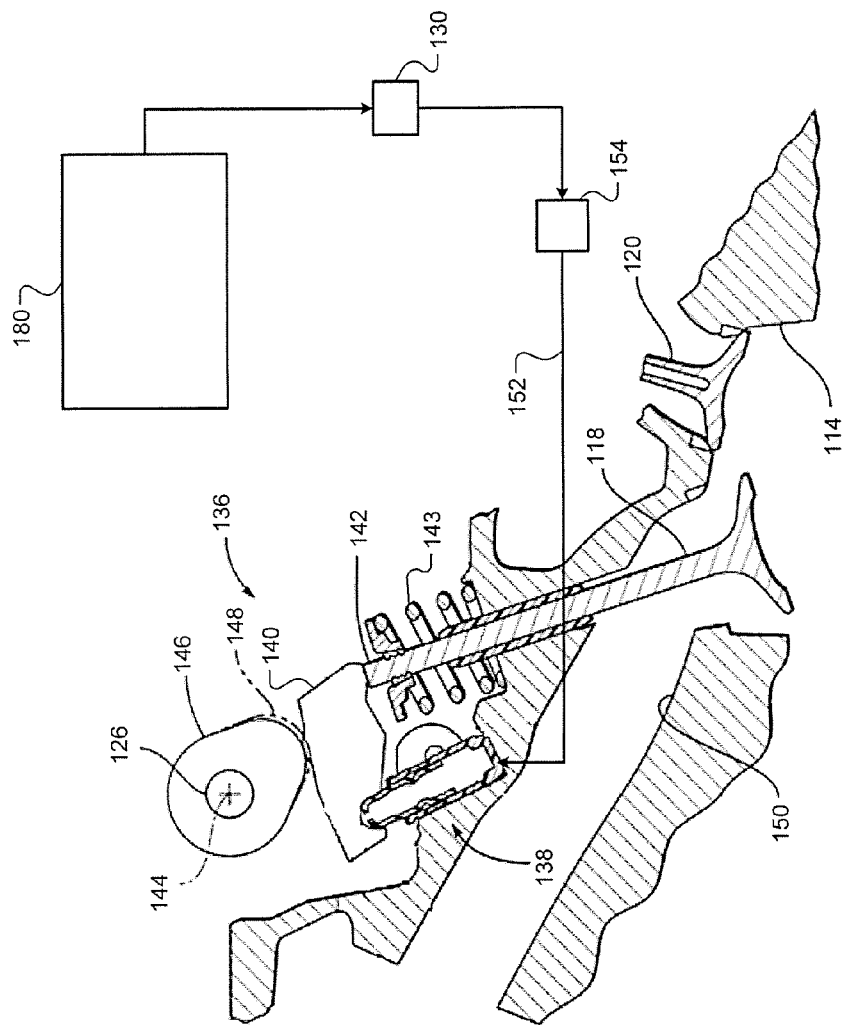
FIG. 1B is a diagram of an example variable valve lift (VVL) system according to the present disclosure.

Referring also to FIG. 1B, during the intake stroke, the piston is lowered to a bottom most position, and air and fuel may be provided to the cylinder 114. The bottom most position may be referred to as a bottom dead center (BDC) position. Air enters the cylinder 114 through one or more intake valves, such as intake valve 118. One or more exhaust valves, such as exhaust valve 120, are also associated with the cylinder 114. For purposes of discussion only, only the intake valve 118 and the exhaust valve 120 will be discussed.

During the compression stroke, the crankshaft 116 drives the piston toward a top most position. The intake valve 118 and the exhaust valve 120 are both closed during the compression stroke, and the piston compresses the air/fuel mixture within the cylinder 114. The top most position may be referred to as a top dead center (TDC) position. A spark plug 122 may ignite the air/fuel mixture in various types of engines. A spark actuator module 124 controls the spark plug 122.

Combustion of the air/fuel mixture drives the piston back toward the BDC position during the expansion stroke, thereby rotatably driving the crankshaft 116. The rotational force (i.e., torque) may be a source of compressive force for a compression stroke of a combustion cycle of a next cylinder in a predetermined firing order. Exhaust gas resulting from the combustion of the air/fuel mixture is expelled from the cylinder 114 during the exhaust stroke. The exhaust gas is expelled from the cylinder 114 via the exhaust valve 120.

The timing of opening and closing of the intake valve 118 is regulated by an intake camshaft 126. An intake camshaft, such as the intake camshaft 126, may be provided for each bank of cylinders of the engine 102. The timing of opening and closing of the exhaust valve 120 is regulated by an exhaust camshaft (not shown). An exhaust camshaft may be provided for each bank of cylinders of the engine 102. Rotation of the intake camshaft(s) and the exhaust camshaft(s) is generally driven by rotation of the crankshaft 116, such as by a belt or a chain.

A cam phaser regulates rotation of an associated camshaft. For example only, intake cam phaser 128 (FIG. 1A) may regulate rotation of the intake camshaft 126 (FIG. 1B). The intake cam phaser 128 may adjust the rotation of the intake camshaft 126, for example, with respect to rotation of the crankshaft 116, with respect to a position of the piston, with respect to another camshaft, etc. For example only, the intake cam phaser 128 may retard or advance rotation of the intake camshaft 126, thereby changing the opening and closing timing of the intake valve 118. Adjusting the rotation of a camshaft with respect to rotation of the crankshaft 116 may be referred to as camshaft phasing.

A phaser actuator module 130 controls the intake cam phaser 128. The phaser actuator module 130 or another phaser actuator module may control operation of other cam phasers. The intake cam phaser 128 may be electrically or hydraulically actuated. Hydraulically actuated cam phasers actuate based on pressure of a hydraulic fluid (e.g., oil) supplied to the cam phaser.

A variable valve lift (VVL) mechanism 136 (FIG. 1B) is associated with the intake valve 118. For example only, the VVL mechanism 136 may include a switchable roller finger follower (SRFF) mechanism. While the VVL mechanism 136 is shown and will be discussed as a SRFF, the VVL mechanism 136 may include other types of valve lift mechanisms that enable an associated valve to be lifted to more than one discrete lift positions. Further, while the VVL mechanism 136 is shown and will be discussed as being associated with the intake valve 118, the VVL mechanism 136 or another VVL mechanism may be implemented similarly for the exhaust valve 120. For example only, one VVL mechanism may be provided for each valve of a cylinder.

The VVL mechanism 136 includes a lift adjuster 138 and a cam follower 140. The cam follower 140 is in mechanical contact with a valve stem 142 of the intake valve 118. A biasing device 143 biases the valve stem 142 into contact with the cam follower 140. The cam follower 140 is also in mechanical contact with the intake camshaft 126 and the lift adjuster 138.

The intake camshaft 126 rotates about a camshaft axis 144. The intake camshaft 126 includes a plurality of cam lobes including low lift cam lobes, such as low lift cam lobe 146, and high lift cam lobes, such as high lift cam lobe 148. For example only, the intake camshaft 126 may include one low lift cam lobe and one high lift cam lobe for each valve of a cylinder. For purposes of discussion only, only operation of the intake valve 118 will be discussed.

The low and high lift cam lobes 146 and 148 rotate with the intake camshaft 126. Air may flow into the cylinder 114 through an inlet passage 150 when the intake valve 118 is open. Airflow into the cylinder 114 through the inlet passage 150 is blocked when the intake valve 118 is closed. The intake valve 118 is selectively lifted (i.e., opened) and lowered (i.e., closed) via the intake camshaft 126. More specifically, the intake valve 118 is opened and closed by the low or high lift cam lobes 146 or 148.

A cam lobe contacting the cam follower 140 applies a force to the cam follower 140 in the direction of the valve stem 142 and the lift adjuster 138. The lift adjuster 138 is collapsible to allow the intake valve 118 to be opened to two different positions, a low lift position and high lift position. The extent to which the lift adjuster 138 is collapsible is based on pressure of a hydraulic fluid 152 provided to the lift adjuster 138. Generally, the extent to which the lift adjuster 138 is collapsible decreases as the pressure of the hydraulic fluid 152 increases and vice versa. As the collapsibility of the lift adjuster 138 decreases, the cam follower 140 applies more of the force of a cam lobe to the valve stem 142, thereby opening the intake valve 118 to a greater extent and vice versa.

The hydraulic fluid 152 may be provided to the lift adjuster 138 at a predetermined low lift pressure and at a predetermined high lift pressure to regulate opening of the intake valve 118 in a low lift mode and a high lift mode, respectively. The predetermined high lift pressure is greater than the predetermined low lift pressure. For example only, the predetermined low lift pressure may be approximately 10 pounds per square inch (psi), and the predetermined high lift pressure may be approximately (25 psi). A fluid control valve 154 regulates the flow of the hydraulic fluid 152 to the lift adjuster 138. The phaser actuator module 130 may control the fluid control valve 154. The fluid control valve 154 may also be referred to as an oil control valve (OCV).

During operation in the low lift mode, the low lift cam lobe 146 causes the VVL mechanism 136 to pivot in accordance with the geometry of the low lift cam lobe 146. The pivoting of the VVL mechanism 136 caused by the low lift cam lobe 146 opens the intake valve 118 a first predetermined amount. During operation in the high lift mode, the high lift cam lobe 148 causes the VVL mechanism 136 to pivot in accordance with the geometry of the high lift cam lobe 148. The pivoting of the VVL mechanism 136 caused by the high lift cam lobe 148 opens the intake valve 118 a second predetermined amount. The second predetermined amount is greater than the first predetermined amount.

A crankshaft position sensor 160 (FIG. 1A) monitors an N-toothed wheel 162 and generates a crankshaft position signal 164 based on rotation of the N-toothed wheel 162. For example only, the crankshaft position sensor 160 may include a variable reluctance (VR) sensor or another suitable type of crankshaft position sensor. The N-toothed wheel 162 rotates with the crankshaft 116. The N-toothed wheel 162 includes space for N equally spaced teeth.

The crankshaft position sensor 160 generates a pulse in the crankshaft position signal 164 each time when a tooth of the N-toothed wheel 162 (e.g., rising or falling edge of the tooth) passes the crankshaft position sensor 160. Accordingly, each pulse in the crankshaft position signal 164 may correspond to an angular rotation of the crankshaft 116 by an amount equal to 360° divided by N. For example only, the N-toothed wheel 162 may include space for 60 equally spaced teeth (i.e., N=60), and each pulse in the crankshaft position signal 164 may therefore correspond to approximately 6° of crankshaft rotation. In various implementations, one or more of the N teeth may be omitted. For example only, two of the N teeth may be omitted in various implementations.

The engine 102 transfers torque to a transmission 170. The transmission 170 may include a manual type transmission, an automatic type transmission, an auto-manual type transmission, or another suitable type of transmission. The transmission 170 may transfer torque to one or more wheels (not shown) via a transmission output shaft 172 and a driveline (not shown).

While the rotational distance between consecutive teeth of the N-toothed wheel 162 should be equal (e.g., 6° in the example above), the rotational distances between consecutive teeth may vary. The variation may be due to, for example, manufacturing tolerances, part-to-part variation, wear, sensor variation, and/or one or more other sources.

An engine control module (ECM) 180 selectively learns the distance between each pair of consecutive teeth of the N-toothed wheel 162. Based on the learned distances and the crankshaft position signal 164, the ECM 180 generates a second crankshaft position signal. The ECM 180 generates an engine speed signal based on the second crankshaft position signal. The engine speed signal at a given crankshaft position indicates the instantaneous engine speed at a crankshaft position.

The ECM 180 determines an indicated work of a combustion cycle of the cylinder 114 based on squares of two or more instantaneous engine speeds at predetermined crankshaft positions of the combustion cycle, respectively. The ECM 180 determines the indicated mean effective pressure (IMEP) for the combustion cycle of the cylinder 114 based on the indicated work and the displacement volume of the engine 102.

Based on the IMEP, the ECM 180 may determine an individual cylinder fuel correction (ICFC) for a future combustion cycle of the cylinder 114, diagnose whether engine misfire occurred during the combustion cycle, diagnose whether one or more faults are present, and/or determine a drivability index (DI) of the fuel. Based on the IMEP, the ECM 180 may additionally or alternatively control one or more engine operating parameters. For example only, engine operating parameters may include camshaft phasing based on a crankshaft angle at which 50% of the fuel will be burnt (CA50) within the cylinder 114, intake and/or valve actuation, ignition timing, and/or one or more other suitable engine operating parameters.

The ECM 180 also determines a coefficient of variation (COV) for the cylinder 114 using the IMEP and a predetermined number of previous IMEPs determined for previous combustion cycles of the cylinder 114, respectively. When operation of the VVL mechanism 136 is commanded to be transitioned from the low lift mode to the high lift mode or vice versa, the ECM 180 selectively diagnoses that the VVL mechanism 136 is stuck in the previous lift mode based on a change in the COV. While diagnosing that the VVL mechanism 136 is stuck will be discussed, the present disclosure is also applicable to other VVL mechanisms associated with other valves. While the present disclosure will be discussed in terms of the VVL mechanism 136, the present disclosure is also applicable to continuously variable valve lift mechanisms, and the ECM 180 selectively diagnoses a fault in a VVL mechanism based on a change in the COV experienced after a change in the lift operation of the VVL mechanism is commanded.

Figure 2:
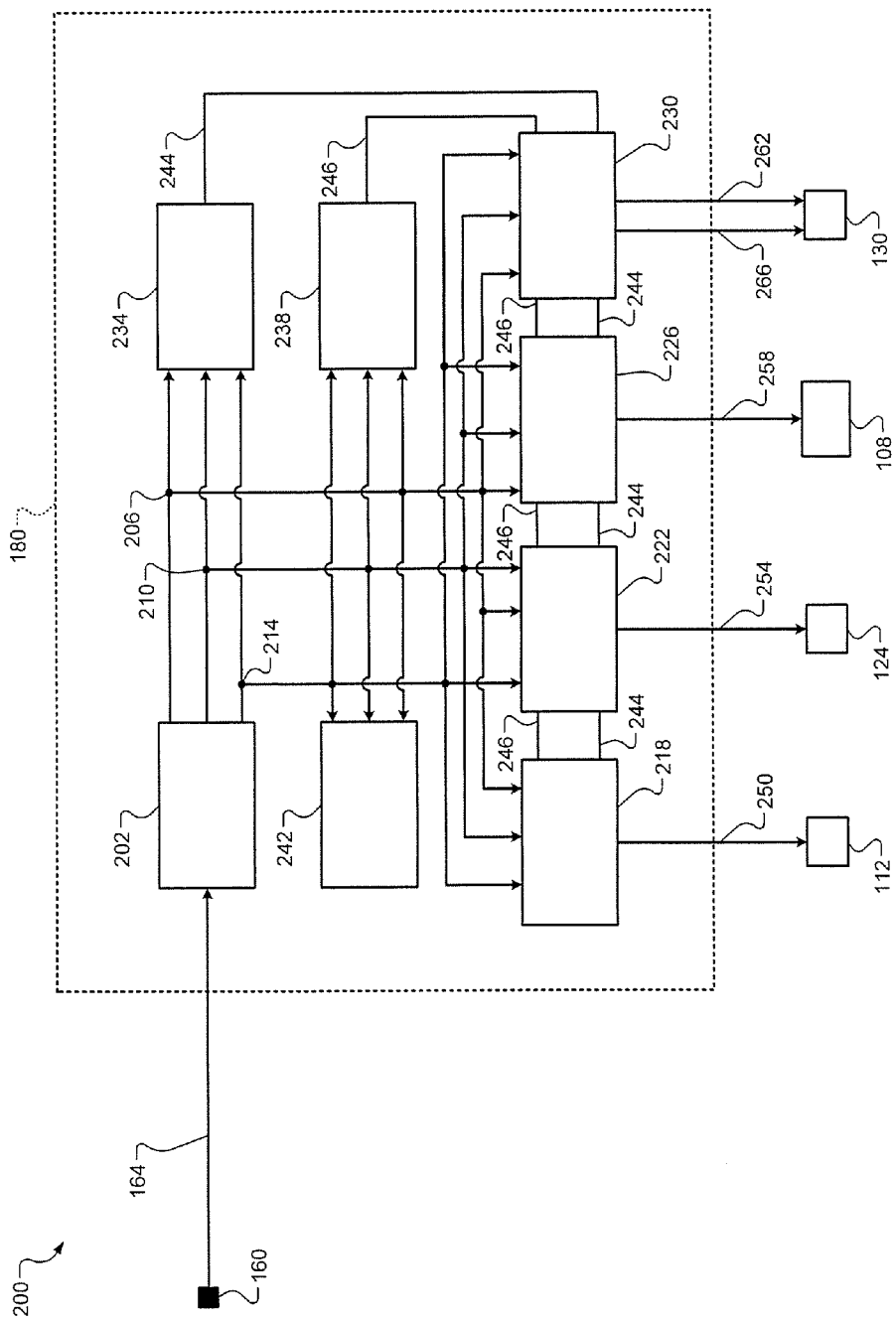
FIGS. 2-3 are functional block diagrams of example control systems according to the present disclosure.

Referring now to FIG. 2, a functional block diagram of an example control system 200 is shown. The control system 200 includes the ECM 180 and the crankshaft position sensor 160. The ECM 180 includes a filter module 202 that generates estimates of the (instantaneous) crankshaft position, the (instantaneous) engine speed, and the crankshaft acceleration based on the crankshaft position signal 164. The filter module 202 generates a crankshaft position signal 206, an engine speed signal 210, and an acceleration signal 214 to indicate the estimates, respectively. The filter module 202 may generate the estimates using, for example, a Kalman based filter, a Chebyshev based filter, a Butterworth type II based filter, or another suitable type of filter. The filter module 202 is discussed in detail below in conjunction with the example embodiment of FIG. 4.

The crankshaft position signal 206, the engine speed signal 210, and/or the acceleration signal 214 may be provided to one or more modules. The modules may include, for example, a fuel control module 218, an ignition control module 222, a throttle control module 226, a valve control module 230, an engine combustion module 234, a misfire module 238, fault detection modules 242, and/or one or more other suitable modules.

The engine combustion module 234 determines combustion information for combustion cycles of the cylinders of the engine 102 based on the crankshaft position signal 206, the engine speed signal 210, and/or the acceleration signal 214. The combustion information is collectively illustrated by 244. For example only, the engine combustion module 234 determines an indicated work for a combustion cycle of the cylinder 114 based on squares of two or more instantaneous engine speeds at predetermined crankshaft positions of the combustion cycle, respectively. The engine combustion module 234 also determines an indicated work for each other combustion cycle of the cylinder 114.

The engine combustion module 234 determines the IMEP for the combustion cycle of the cylinder 114 based on the indicated work for the combustion cycle. The engine combustion module 234 determines the IMEP for the combustion cycle of the cylinder 114 further based on a displacement volume of the engine 102. The engine combustion module 234 also determines the indicated work and the IMEP for each combustion event of each of the other cylinders of the engine 102.

The engine combustion module 234 determines the COV for the cylinder 114 based on a predetermined number of IMEPs associated with a predetermined number of previous combustion cycles of the engine 102, respectively. The COV may be equal to a standard deviation of the predetermined number of IMEPs divided by an average of the predetermined number of IMEPs. The engine combustion module 234 is discussed in detail below in conjunction with the example embodiment of FIG. 5.

The misfire module 238 may generate misfire information based on the crankshaft position signal 206, the engine speed signal 210, and/or the acceleration signal 214. The misfire information is collectively illustrated by 246. The combustion information 244 and/or misfire information 246 may be used, for example, to adjust fueling and/or timing, spark timing, opening of the throttle valve 106, intake and/or exhaust valve actuation, and/or one or more other engine operating parameters. For example only, the fuel control module 218, the ignition control module 222, the throttle control module 226, and the valve control module 230 may generate signals 250, 254, 258, and 262 provided to the fuel actuator module 112, the spark actuator module 124, the throttle actuator module 108, and the phaser actuator module 130, respectively, based on the combustion information 244, the misfire information 246, and/or other information. The valve control module 230 may also generate a signal 266 based on the combustion information, the misfire information 246, and/or other information. The signal 266 may be used to indicate a commanded lift mode of one or more of the valves of the cylinder 114. For example only, the signal 266 may be used to command operation of the VVL mechanism 136 in the high lift mode or in the low lift mode.

The fuel actuator module 112 controls fuel injection and timing based on the signal 250. The spark actuator module 124 controls spark timing based on the signal 254 in spark-ignition type engines. The throttle actuator module 108 controls opening of the throttle valve 106 based on the signal 258. The phaser actuator module 130 controls the intake cam phaser 128 based on the signal 262. The phaser actuator module 130 may control the fluid control valve 154 based on the signal 266 to operate the VVL mechanism 136 of the cylinder 114 in the commanded lift mode.

The fault detection modules 242 may selectively diagnose the presence of one or more faults based on the crankshaft position signal 206, the engine speed signal 210, the acceleration signal 214, the combustion information 244, and/or the misfire information 246. One of the fault detection modules 242 is discussed further below in conjunction with FIG. 6.

Figure 3:
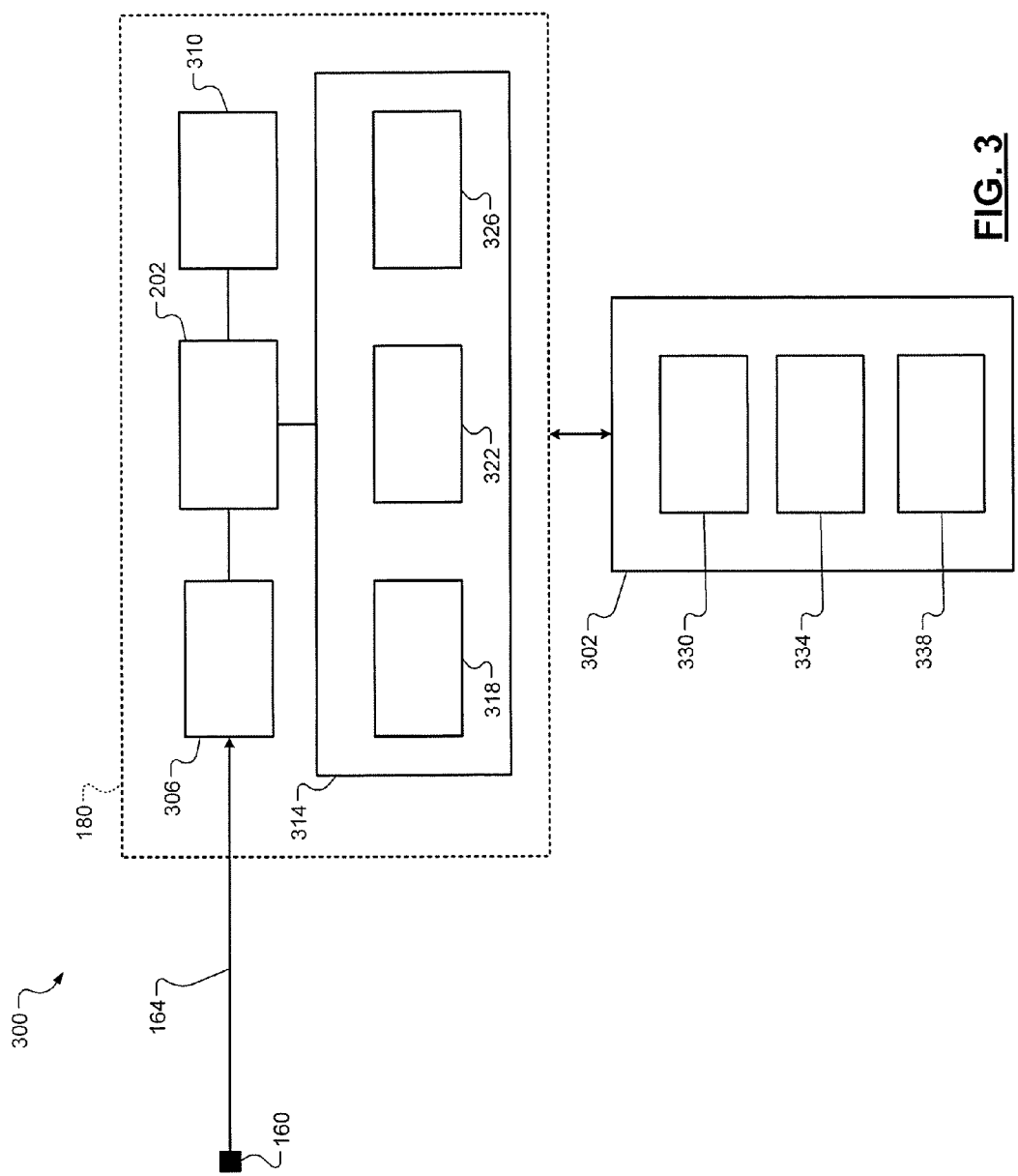

Referring now to FIG. 3, a functional block diagram of another control system 300 is presented. The control system 300 includes the ECM 180 and memory 302. In various implementations, the memory 302 may be implemented within the ECM 180. The ECM 180 includes a time recording module 306, the filter module 202, a velocity setting module 310, and a position history module 314. The position history module 314 includes a constant acceleration module 318, a constant jerk module 322, and an exponential decay module 326. The memory 302 includes timestamp arrays 330, teeth position arrays 334, and a consolidated teeth position array 338.

The time recording module 306 records timestamps for each pulse in the crankshaft position signal 164, for example, during a crankshaft deceleration event. The timestamps may be recorded during a tooth learn procedure. Each of the timestamps may be associated with one of the teeth of the N-toothed wheel 162. Crankshaft position, engine speed, and/or acceleration information may be obtained based on the stored timestamps.

The timestamps may be stored in the timestamp arrays 330. The timestamp arrays 330 may include one timestamp array 330 for each of the N teeth of the N-toothed wheel 162, and the timestamps may be stored by tooth in the associated timestamp array 330. In this manner, a given timestamp array may include timestamps for the associated tooth for one or more revolutions of the N-toothed wheel 162. Each of the N timestamp arrays includes M entries where a timestamp is or can be stored. Each of the M entries is associated with a particular engine cycle (i.e., 2 revolutions of the N-toothed wheel 162).

The filter module 202 may operate based on information from the time recording module 306, the velocity setting module 310, the position history module 314, and/or the memory 302. The modules 218-242, of FIG. 2, may also operate based on information from the time recording module 306, the velocity setting module 310, the position history module 314, and/or the memory 302.

The velocity setting module 310 may be used to control engine speed for a tooth learning procedure. The tooth learning procedure may involve determining the position (e.g., crankshaft angle degrees) of each tooth of the N-toothed wheel 162 (e.g., a falling edge of the tooth). The position of each tooth may be used to determine the rotational distance between successive teeth. The position history module 314 may perform the tooth learning procedure and determine the positions based on the timestamps stored in the timestamp arrays 330. The positions may each be stored in the teeth position arrays 334.

The teeth position arrays 334 may include N tooth position arrays 334 where N is equal to the N of the N-toothed wheel 162. Each of the N tooth position arrays 334 includes X entries where a crankshaft position is or can be stored. Each of the X entries is associated with a particular engine cycle. The positions can be determined via the constant acceleration module 318, the constant jerk module 322, and/or the exponential decay module 326.

The position history module 314 may average the X position entries of each of the N tooth position arrays of the teeth position arrays 334 to determine N average positions. Each of the N average positions corresponds to an average of the X position entries determined for the associated tooth of the N-toothed wheel 162. The N average positions may each be stored in one of N arrays in the consolidated teeth position array 338.

Figure 4:
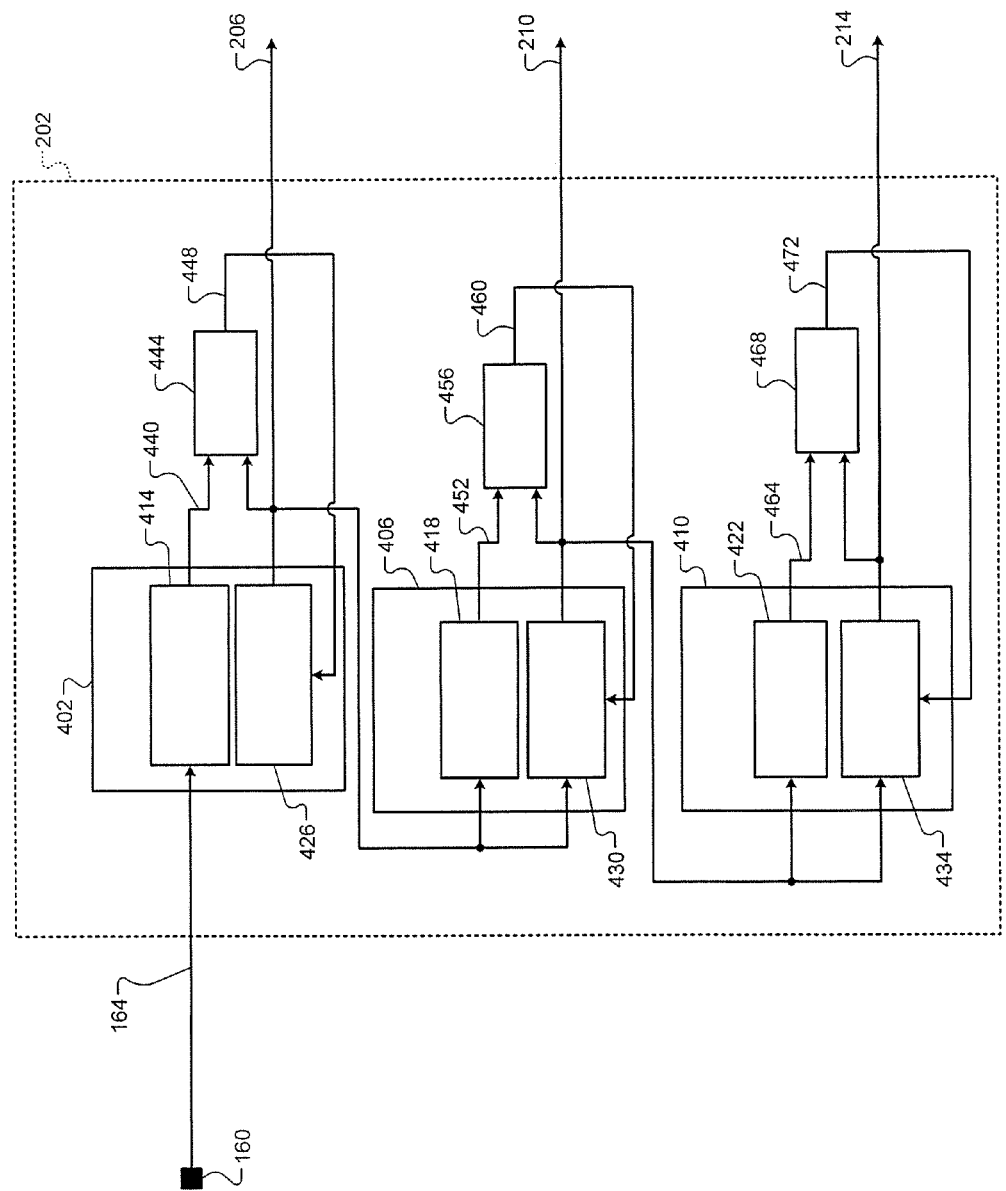
FIG. 4 is a functional block diagram of an example filter module according to the present disclosure.

Referring now to FIG. 4, a functional block diagram of an example implementation of the filter module 202 is presented. The filter module 202 may include, for example, a Kalman filter, a Butterworth type II filter, a Chebyshev filter, or another suitable type of filter. In the case of the filter module 202 including a Kalman filter, the filter module 202 may include a state estimator that is used to determine or estimate instantaneous crankshaft position, instantaneous engine speed, and (average) crankshaft acceleration.

Functions (e.g., equations) describing the dynamics of the engine 102 are defined. The functions are used to produce estimates of state variables (e.g., instantaneous crankshaft position, instantaneous engine speed, and crankshaft acceleration). The estimates are compared to measured values of the state variables to generate error signals, respectively, which are fed back to correct future estimates of the state variables. For example, the error between estimated and measured instantaneous engine speed is fed back to correct future estimates of the instantaneous engine speed.

The filter module 202 may include a position filtering module 402, a speed filtering module 406, and an acceleration filtering module 410. The position, speed, and acceleration filtering modules 402, 406, and 410 include position, speed, and acceleration calculator modules 414, 418, and 422, respectively. The position, speed, and acceleration filtering modules 402, 406, and 410 also include position, speed, and acceleration estimator modules 426, 430, and 434, respectively. The outputs of the estimator modules 426, 430, and 434 are the crankshaft position signal 206, the engine speed signal 210, and the acceleration signal 214, respectively. The position, speed, and acceleration filtering modules 402, 406, and 410 may operate based on information from the time recording module 306, the velocity setting module 310, the position history module 314, and/or the memory 302 of FIG. 3.

The position calculator module 414 receives the crankshaft position signal 164 from the crankshaft position sensor 160. The position calculator module 414 generates a second crankshaft position signal 440 based on the crankshaft position signal 164. The position estimator module 426 outputs the crankshaft position signal 206.

An error module 444 generates a position error signal 448 based on a difference between the crankshaft position signal 206 and the second crankshaft position signal 440. The position error signal 448 is fed back to the position estimator module 426, and the position estimator module 426 may selectively adjust the crankshaft position signal 206 in the future based on the position error signal 448.

The speed calculator module 418 receives the crankshaft position signal 206. The speed calculator module 418 generates a second engine speed signal 452 based on the crankshaft position signal 206. The speed estimator module 430 outputs the engine speed signal 210.

An error module 456 generates a speed error signal 460 based on a difference between the engine speed signal 210 and the second engine speed signal 452. The speed error signal 460 is fed back to the speed estimator module 430, and the speed estimator module 430 may adjust the engine speed signal 210 in the future based on the speed error signal 460.

The acceleration calculator module 418 receives the engine speed signal 210. The acceleration calculator module 418 generates a second acceleration signal 464 based on the engine speed signal 210. The acceleration estimator module 434 outputs the acceleration signal 214.

An error module 468 generates an acceleration error signal 472 based on a difference between the acceleration signal 214 and the second acceleration signal 464. The acceleration error signal 472 is fed back to the acceleration estimator module 434, and the acceleration estimator module 434 may adjust the acceleration signal 214 in the future based on the acceleration error signal 472. The engine speeds 210 may be stored by crankshaft position 206, for example in memory. The accelerations 214 and/or the crankshaft positions 206 may also be stored.

Figure 5:
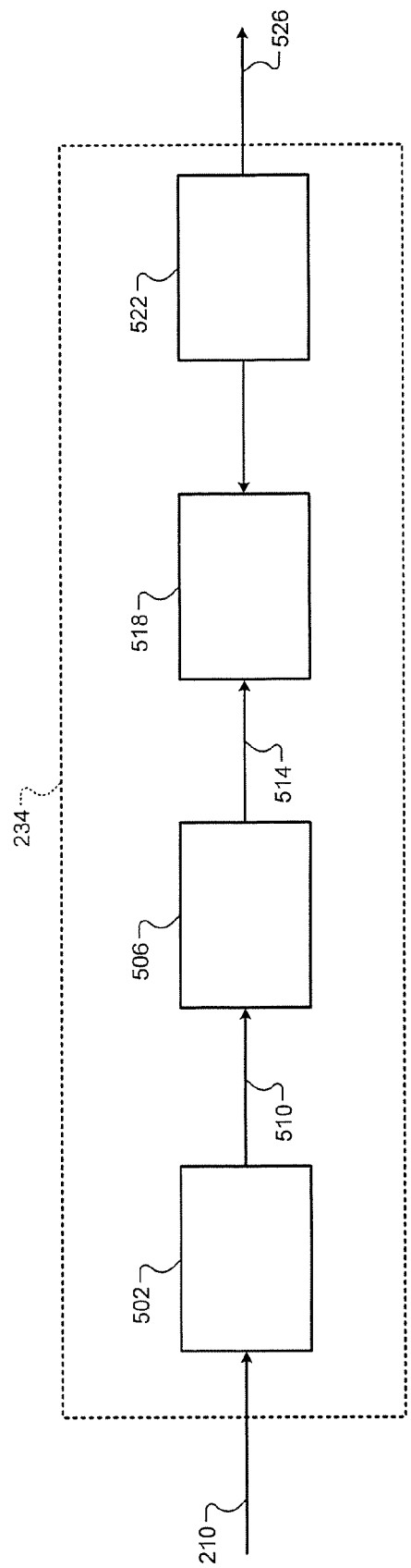
FIG. 5 is a functional block diagram of an example engine combustion module according to the present disclosure.

Referring now to FIG. 5, a functional block diagram of an example implementation of the engine combustion module 234 is presented. The engine combustion module 234 may include an indicated work determination module 502, an IMEP determination module 506, a buffer module 518, and a coefficient of variation (COV) determination module 522.

The indicated work determination module 502 receives the engine speed signal 210 from the filter module 202. The indicated work determination module 502 determines an indicated work 510 for a combustion cycle of the cylinder 114 based on squares of two or more of the engine speeds 210 at predetermined crankshaft positions, respectively, of the combustion cycle. The indicated work determination module 502 determines an indicated work 510 for each combustion cycle of the cylinder 114 and may determine an indicated work 510 for each combustion cycle of each other cylinder of the engine 102.

For a first example only, the indicated work determination module 502 may determine the indicated work 510 for a combustion cycle of the cylinder 114 using the equation:

$$W = \omega_e^2 - \omega_s^2, \tag{1}$$

where W is the indicated work, $\omega_e$ is a first engine speed 210 at a first predetermined crankshaft position of the expansion stroke of the combustion cycle of the cylinder 114, and $\omega_s$ is a second engine speed 210 at a second predetermined crankshaft position of the expansion stroke. The first predetermined crankshaft position occurs later in the expansion stroke (i.e., further from TDC) than the second predetermined crankshaft position. For example only, the first and second predetermined crankshaft positions may be approximately 36 crankshaft angle degrees (CAD) after TDC and 30 CAD after TDC, respectively, 40 CAD after TDC and 20 CAD after TDC, respectively, or other suitable crankshaft positions. In various implementations, the first predetermined crankshaft position occurs during the compression stroke, and the second predetermined crankshaft position occurs after first predetermined crankshaft position during the expansion stroke.

For a second example only, the indicated work determination module 502 may determine the indicated work 510 for a combustion cycle of the cylinder 114 using the equation:

$$W = p^*(\omega_e^2 - \omega_s^2) + q, \tag{2}$$

where W is the indicated work, $\omega_e$ is a first engine speed 210 at a first predetermined crankshaft position of the expansion stroke of the combustion cycle of the cylinder 114, $\omega_s$ is a second engine speed 210 at a second predetermined crankshaft position of the expansion stroke, p is a predetermined (e.g., calibrated) gain, and q is a predetermined (e.g., calibrated) offset. The first predetermined crankshaft position occurs later in the expansion stroke than the second predetermined crankshaft position. In various implementations, the first predetermined crankshaft position occurs during the compression stroke, and the second predetermined crankshaft position occurs after first predetermined crankshaft position during the expansion stroke.

Equation (2) can be written in matrix form as:

$$W = [(\omega_e^2 - \omega_s^2 \quad 1)] * \begin{bmatrix} p \\ q \end{bmatrix}. \tag{3}$$

For a large data set over Z combustion cycles, equation (3) can be expanded to:

$$\begin{bmatrix} W_1 \\ W_2 \\ \vdots \\ W_Z \end{bmatrix} = \begin{bmatrix} (\omega_{1e}^2 - \omega_{1s}^2) & 1 \\ (\omega_{2e}^2 - \omega_{2s}^2) & 1 \\ \vdots & \\ (\omega_{Ze}^2 - \omega_{Zs}^2) & 1 \end{bmatrix} * \begin{bmatrix} p \\ q \end{bmatrix}. \tag{4}$$

The predetermined gain (p) and the predetermined offset (q) used by the indicated work determination module 502 in determining the indicated work 510 can be determined by collecting measured cylinder pressure data (using a cylinder pressure sensor not shown in FIG. 1), collecting the engine speed 210 data ($\omega_1, \omega_2, \ldots$) at various crankshaft positions (at least e and s), determining the indicated works ($W_1, W_2, \ldots$) based on the measured cylinder pressure data, and solving equation (4) for the predetermined gain and the predetermined offset. For example only, the predetermined gain and the predetermined offset may be determined by solving equation (4) using a regression fit analysis. Once the predetermined gain and the predetermined offset have been determined, the indicated work determination module 502 can determine the indicated work 510 during operation of the engine 102 without measured cylinder pressure data and without a cylinder pressure sensor.

For a third example only, the indicated work determination module 502 may determine the indicated work 510 for a combustion cycle of the cylinder 114 using the equation:

$$W = (\omega_e^2 - \omega_s^2) + (\omega_y^2 - \omega_x^2), \tag{5}$$

where W is the indicated work 510, $\omega_e$ is a first engine speed 210 at a first predetermined crankshaft position of the expansion stroke of the combustion cycle of the cylinder 114, $\omega_s$ is a second engine speed 210 at a second predetermined crankshaft position of the expansion stroke, $\omega_y$ is a third engine speed 210 at a third predetermined crankshaft position of the compression stroke of the combustion cycle of the cylinder 114, and $\omega_x$ is a fourth engine speed 210 at a fourth predetermined crankshaft position of the compression stroke. The first predetermined crankshaft position occurs later in the expansion stroke than the second predetermined crankshaft position, and the fourth predetermined crankshaft position occurs later in the compression stroke (i.e., more toward TDC) than the third predetermined crankshaft position. For example only, the first, second, third, and fourth predetermined crankshaft positions may be approximately 36 CAD after TDC, 30 CAD after TDC, 60 CAD before TDC, and 24 CAD before TDC, respectively.

For a fourth example only, the indicated work determination module 502 may determine the indicated work 510 for a combustion cycle of the cylinder 114 using the equation:

$$W = p^*(\omega_e^2 - \omega_s^2) + q^*(\omega_y^2 - \omega_x^2) + r, \tag{6}$$

where W is the indicated work 510, $\omega_e$ is a first engine speed 210 at a first predetermined crankshaft position of the expansion stroke of the combustion cycle of the cylinder 114, $\omega_s$ is a second engine speed 210 at a second predetermined crankshaft position of the expansion stroke, $\omega_y$ is a third engine speed 210 at a third predetermined crankshaft position of the compression stroke of the combustion cycle of the cylinder 114, $\omega_x$ is a fourth engine speed 210 at a fourth predetermined crankshaft position of the compression stroke, p and q are first and second predetermined gains, respectively, and r is a predetermined offset. The first predetermined crankshaft position occurs later in the expansion stroke than the second predetermined crankshaft position, and the fourth predetermined crankshaft position occurs later in the compression stroke than the third predetermined crankshaft position. The first and second predetermined gains (p and q) and the predetermined offset (r) may be determined in a similar manner to that described above in conjunction with equations (2)-(4).

For a fifth example only, the indicated work determination module 502 may determine the indicated work 510 for a combustion cycle of the cylinder 114 using the equation:

$$W = p^*\omega_p^2 + q^*\omega_q^2 + r^*\omega_r^2 + s^*\omega_s^2 + t^*\omega_t^2 + u^*\omega_u^2 + v, \tag{7}$$

where W is the indicated work 510, $\omega_p, \omega_q, \omega_r, \omega_s, \omega_t,$ and $\omega_u$ are first, second, third, fourth, fifth, and sixth engine speeds 210 at first, second, third, fourth, fifth, and sixth predetermined crankshaft positions of the combustion cycle of the cylinder 114, respectively, p, q, r, s, t, and u are first, second, third, fourth, fifth, and sixth predetermined gains, and v is a predetermined offset. For example only, the first, second, third, fourth, fifth, and sixth predetermined crankshaft positions may be approximately 72 CAD before TDC, 36 CAD before TDC, 24 CAD before TDC, 12 CAD after TDC, 30 CAD after TDC, and 36 CAD after TDC, respectively. The first, second, third, fourth, fifth and sixth predetermined gains (p, q, r, s, t, and u) and the predetermined offset (v) may be determined in a similar manner to that described above in conjunction with equations (2)-(4). In various implementations, the indicated work determination module 502 may determine the indicated work 510 using another suitable function or mapping that relates two or more squares of engine speed 210 to the indicated work 510.

The IMEP determination module 506 determines the IMEP 514 for the combustion cycle of the cylinder 114 based on the indicated work 510 for the combustion cycle of the cylinder 114. The IMEP determination module 506 may determine the IMEP 514 further based on a displacement volume of the engine 102. For example only, the IMEP determination module 506 may set the IMEP 514 equal to the indicated work 510 for the combustion cycle divided by a displacement volume of the engine 102. The displacement volume of the engine 102 is a predetermined value that may be stored in memory. As the IMEP 514 is determined from the indicated work 510 determined specifically for the combustion event of the cylinder 114, the IMEP 514 can be referred to as an absolute IMEP as opposed to a relative IMEP that is determined relative to other cylinders of the engine 102.

The IMEP determination module 506 stores the IMEP 514 for the combustion cycle of the cylinder 114 in the buffer module 518. The buffer module 518 may include, for example, an array, a ring or circular buffer and may include a predetermined number of entry locations for the cylinder 114. The IMEP 514 of the combustion cycle and IMEPs 514 from past combustion cycles of the cylinder 114 may be stored in the predetermined number of entry locations. The predetermined number may be an integer greater than one. The IMEPs of the other cylinders of the engine 102 may also be stored in the buffer module 518 indexed by cylinder.

The COV determination module 522 determines a COV 526 for the cylinder 114 based on the predetermined number of the IMEPs 514 of the cylinder 114 stored in the buffer module 518. The COV determination module 522 may set the COV 526 equal to a standard deviation of the predetermined number of the IMEPs 514 divided by an average of the predetermined number of the IMEPs 514. The COV determination module 522 outputs the COV 526. The COV 526 may be used by one or more modules.

Figure 6:
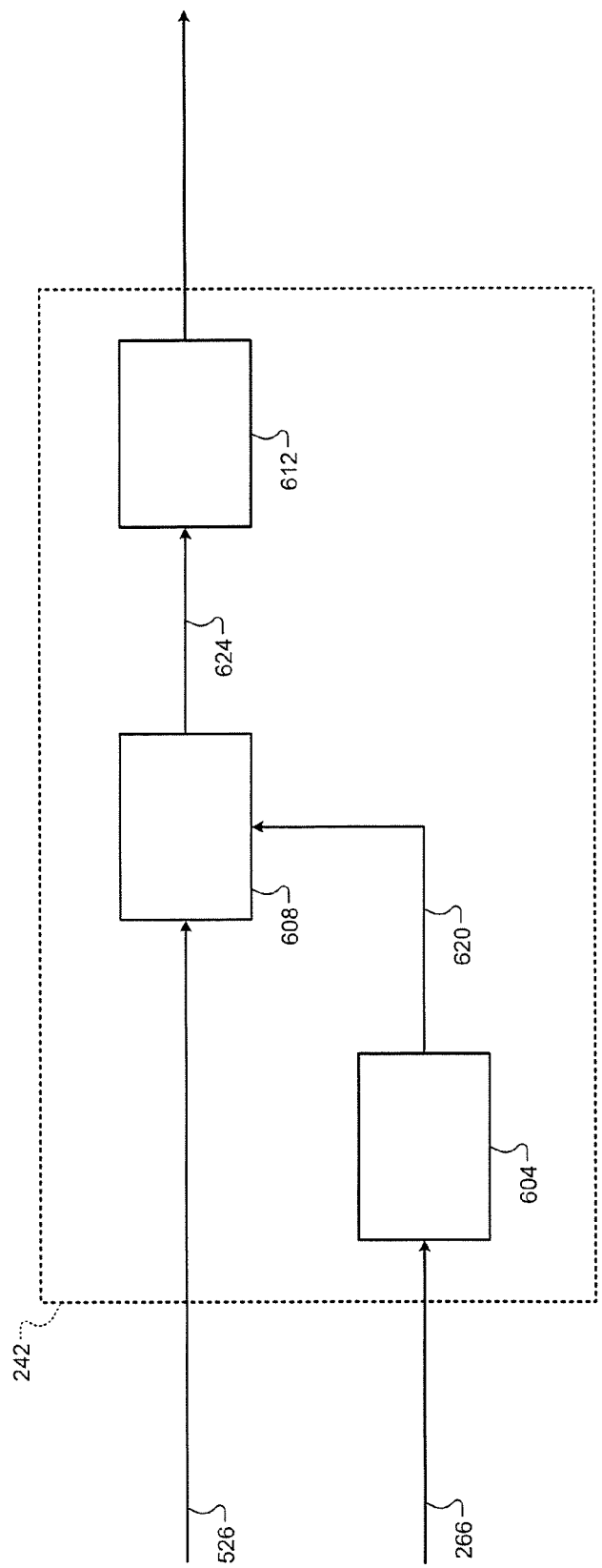
FIG. 6 is a functional block diagram of an example fault detection module according to the present disclosure.

Referring now to FIG. 6, a functional block diagram of an example implementation of a fault detection module 242 is presented. The fault detection module 242 may include a transition detection module 604, a stuck mechanism indicator module 608, and a remedial action module 612.

The transition detection module 604 detects when a transition from the low lift mode to the high lift mode or vice versa is commanded for the VVL mechanism 136. The transition detection module 604 may detect that a transition from one of the lift modes to the other of the lift modes has been commanded based on the signal 266. For example only, the transition detection module 604 may detect that a transition from one of the lift modes to the other of the lift modes has been commanded when the signal 266 changes. As stated above, the signal 266 may indicate a commanded lift mode for the VVL mechanism 136 and/or one or more other VVL mechanisms.

The transition detection module 604 generates a transition signal 620 when a transition from one of the lift modes to the other of the lift modes has been commanded. For example only, the transition detection module 604 may set the transition signal 620 to an active state when a transition has been commanded.

The stuck mechanism indicator module 608 determines whether the VVL mechanism 136 of the cylinder 114 is stuck in the previous lift mode after a transition from one of the lift modes to the other one of the lift modes has been commanded. More generally, the stuck mechanism indicator module 608 determines whether to attribute a fault to the VVL mechanism 136 after a change in the lift mode has been commanded. For example only, the stuck mechanism indicator module 608 determines whether the VVL mechanism 136 is stuck in the low lift mode after a transition from the low lift mode to the high lift mode has been commanded. For another example only, the stuck mechanism indicator module 608 determines whether the VVL mechanism 136 is stuck in the high lift mode after a transition from the high lift mode to the low lift mode has been commanded.

The stuck mechanism indicator module 608 determines whether the VVL mechanism 136 is stuck in the previous lift mode after a transition has been commanded based on a change in the COV 526 of the cylinder 114 after the transition is commanded. More specifically, the stuck mechanism indicator module 608 determines whether the VVL mechanism 136 is stuck based on whether the COV 526 changes by at least a predetermined amount or percentage in an appropriate direction after the transition is commanded.

For example only, in response to the transition detection module 604 indicating that a transition has been commanded, the stuck mechanism indicator module 608 may store the COV 526 of the cylinder 114. The stuck mechanism indicator module 608 may determine a reference COV based on the stored COV 526 of the cylinder 114 and a predetermined percentage. For example only, the stuck mechanism indicator module 608 may set the reference COV using the equation:

$$\text{Reference} = \text{Stored} \pm (\text{Stored}*\text{Percentage}), \quad (8)$$

where Reference is the reference COV, Stored is the stored COV 526, and Percentage is the predetermined percentage. For example only, the predetermined percentage may be approximately 5 percent or another suitable value.

The stuck mechanism indicator module 608 determines whether to use addition or subtraction in the above equation (8) based on whether the commanded transition is to the high lift mode or to the low lift mode. The stuck mechanism indicator module 608 may select addition when the commanded transition is to the high lift mode. In this manner, when a transition is commanded from the low lift mode to the high lift mode, the stuck mechanism indicator module 608 may set the reference COV using the equation:

$$\text{Reference} = \text{Stored} + (\text{Stored}*\text{Percentage}), \quad (9)$$

where Reference is the reference COV, Stored is the stored COV 526, and Percentage is the predetermined percentage. The stuck mechanism indicator module 608 may select subtraction when the commanded transition is to the low lift mode. In this manner, when a transition is commanded from the high lift mode to the low lift mode, the stuck mechanism indicator module 608 may set the reference COV using the equation:

$$\text{Reference} = \text{Stored} - (\text{Stored}*\text{Percentage}), \quad (10)$$

where Reference is the reference COV, Stored is the stored COV 526, and Percentage is the predetermined percentage.

The stuck mechanism indicator module 608 may determine whether the VVL mechanism 136 is stuck in the previous lift mode after a commanded transition based on a comparison of the COV 526 after the transition with the reference COV. For example only, the stuck mechanism indicator module 608 may determine that the VVL mechanism 136 is stuck in the low lift mode when the COV 526 after the commanded transition is greater than the reference COV. The stuck mechanism indicator module 608 may determine that the VVL mechanism 136 is stuck in the high lift mode when the COV 526 after the commanded transition is less than the reference COV. The stuck mechanism indicator module 608 may use the COV 526 determined when at least the predetermined number of combustion cycles have been completed after the completed transition is commanded. Use of the COV 526 determined after the predetermined number of combustion cycles have been completed may ensure that the IMEPs 514 from before the commanded transition do not skew the value of the COV 526.

The stuck mechanism indicator module 608 generates a stuck signal 624 when the VVL mechanism 136 is stuck in the previous lift mode. For example only, the stuck mechanism indicator module 608 may set the stuck signal 624 to an active state when the VVL mechanism 136 is stuck in the previous lift mode. The stuck mechanism indicator module 608 may also generate the stuck signal 624 or another signal to indicate the cylinder 114 associated with the VVL mechanism 136 and whether the VVL mechanism 136 is stuck in the low lift mode or in the high lift mode.

The remedial action module 612 may take one or more remedial actions when the stuck mechanism indicator module 608 indicates that the VVL mechanism 136 is stuck in the previous lift mode. For example only, the remedial action module 612 may limit engine speed, set a diagnostic flag associated with the VVL mechanism 136 of the cylinder 114 being stuck, command operation of all of the VVL mechanisms of the engine 102 in a default lift mode (e.g., the high lift mode), prevent future changes in the commanded lift mode, and/or illuminate a predetermined light, such as a malfunction indicator light (MIL). Remedial actions such as limiting the engine speed when a VVL mechanism is stuck is may mitigate or prevent engine component damage.

Figure 7:
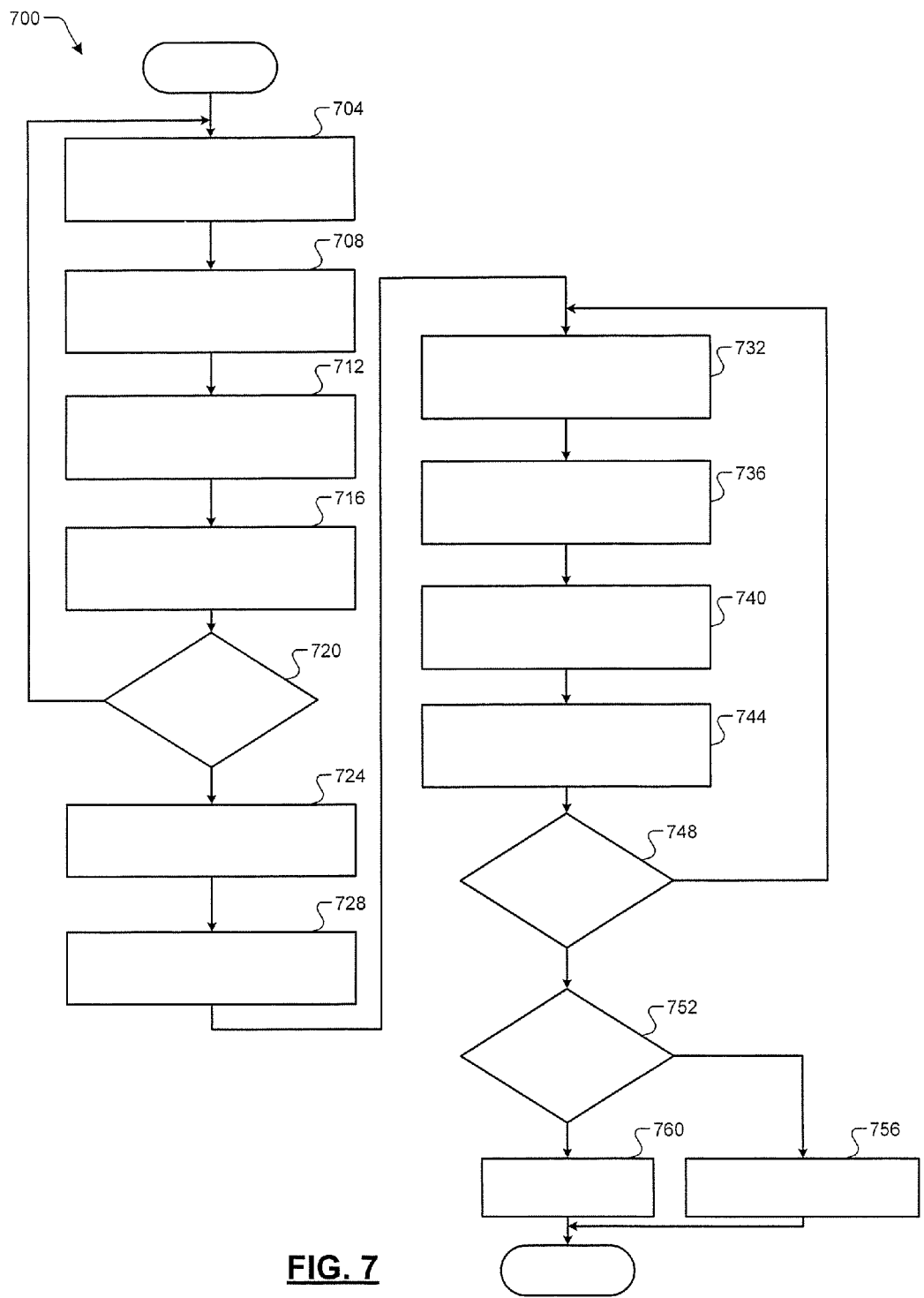
FIG. 7 is a flowchart of an example method of detecting when a VVL mechanism is stuck in a low lift mode according to the present disclosure.

Referring now to FIG. 7, a flowchart depicting an example method 700 of determining whether a VVL mechanism of a cylinder is stuck in the low lift mode after a transition is commanded from the low lift mode to the high lift mode is presented. Control begins with 704 where control generates the engine speeds 210 at various crankshaft positions during a combustion cycle of the cylinder.

At 708, control determines the indicated work 510 of the combustion cycle of the cylinder based on the squares of two or more of the engine speeds 210 at predetermined crankshaft positions, respectively, of the combustion cycle. For example only, control may determine the indicated work 510 using equation (1), (2), (5), (6), (7), or another suitable function that relates squares of two or more of the engine speeds 210 to the indicated work 510.

Control determines the IMEP 514 of the combustion cycle of the cylinder based on the indicated work 510 of the combustion cycle at 712. Control may determine the IMEP 514 of the combustion cycle further based on a displacement volume of the engine 102. Control determines the COV 526 for the cylinder based on the IMEP 514 at 716. Control determines the COV 526 further based on one or more previous IMEPs 514 of the cylinder determined for past combustion cycles of the cylinder, respectively.

Control determines whether a transition from the low lift mode to the high lift mode has been commanded for the VVL mechanism of the cylinder at 720. If true, control continues to 724; if false, control returns to 704 for a next combustion cycle of the cylinder. At 724, control stores the COV 526. Control determines the reference COV at 728 based on the stored COV. Control may determine the reference COV further based on the predetermined percentage. Control may determine the reference COV using, for example, equation (9) above when the commanded transition is from the low lift mode to the high lift mode.

At 732, control generates the engine speeds 210 at various crankshaft positions during a second combustion cycle of the cylinder. At 736, control determines the indicated work 510 of the second combustion cycle of the cylinder based on the squares of two or more of the engine speeds 210 at predetermined crankshaft positions, respectively, of the second combustion cycle. For example only, control may determine the indicated work 510 using equation (1), (2), (5), (6), (7), or another suitable function that relates squares of two or more of the engine speeds 210 to the indicated work 510.

Control determines the IMEP 514 of the second combustion cycle of the cylinder based on the indicated work 510 of the second combustion cycle at 740. Control may determine the IMEP 514 of the second combustion cycle further based on the displacement volume of the engine 102. Control determines the COV 526 based on the IMEP 514 at 744. Control determines the COV 526 further based on one or more previous IMEPs 514 of the cylinder determined for past combustion cycles of the cylinder, respectively.

Control determines whether a predetermined period has passed after the transition from the low lift mode to the high lift mode was commanded at 748. If true, control proceeds with 752; if false, control returns to 732 for a next combustion cycle of the cylinder. For example only, the predetermined period may be a predetermined number of combustion cycles of the cylinder. The predetermined number of combustion cycles may be equal to or greater than the number of the IMEPs 514 used in determining the COV 526.

At 752, control determines whether the COV 526 for the cylinder is greater than the reference COV. If true, control indicates that the VVL mechanism is stuck in the low lift mode at 756, and control may end. If false, control may indicate that the VVL mechanism is not stuck at 760 and control may end.

Figure 8:
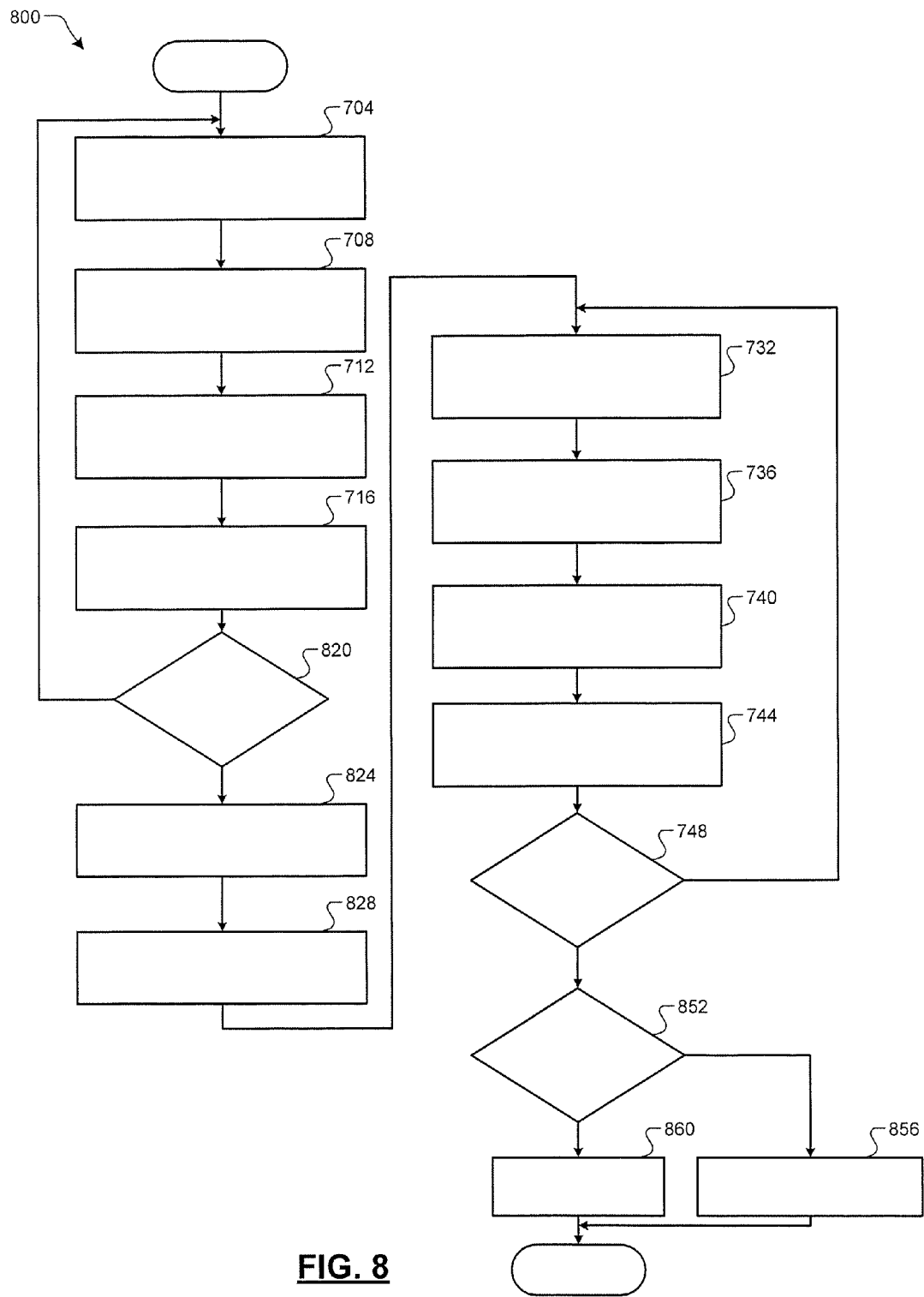
FIG. 8 is a flowchart of an example method of detecting when a VVL mechanism is stuck in a high lift mode according to the present disclosure.

Referring now to FIG. 8, a flowchart depicting an example method 800 of determining whether a VVL mechanism of a cylinder is stuck in the high lift mode after a transition is commanded from the high lift mode to the low lift mode is presented. Control may perform 704-716 and proceed to 820.

At 820, control determines whether a transition from the high lift mode to the low lift mode has been commanded for the VVL mechanism of the cylinder. If so, control continues to 824; if false, control returns to 704 for a next combustion cycle of the cylinder. At 824, control stores the COV 526. Control determines the reference COV at 828 based on the stored COV. Control may determine the reference COV further based on the predetermined percentage. Control may determine the reference COV using, for example, equation (10) above when the commanded transition is from the high lift mode to the low lift mode. Control may then perform 732-748 and proceed to 852.

Control determines whether the COV 526 is less than the reference COV at 852. If true, control indicates that the VVL mechanism of the cylinder is stuck in the high lift mode at 856, and control may end. If false, control indicates that the VVL mechanism is not stuck at 860, and control may end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a filtering module that generates engine speeds based on positions of teeth of a toothed wheel that rotates with a crankshaft and based on a crankshaft position signal generated by a crankshaft position sensor;
an indicated mean effective pressure (IMEP) determination module that determines an IMEP for a combustion cycle of a cylinder of an engine based on squares of first and second ones of the engine speeds during the combustion cycle; and
a stuck mechanism indicator module that selectively diagnoses a fault in a variable valve lift (VVL) mechanism of the cylinder based on the IMEP.

2. The system of claim 1 further comprising a coefficient of variation (COV) determination module that determines a COV for the cylinder based on the IMEP,
wherein the stuck mechanism indicator module selectively diagnoses the fault in the VVL mechanism based on the COV.

3. The system of claim 2 wherein the stuck mechanism indicator module selectively diagnoses the fault in the VVL mechanism based on a change in the COV.

4. The system of claim 2 further comprising a transition detection module that selectively indicates that a transition from one of a high lift mode and a low lift mode to another one of the high and low lift modes has been commanded for the VVL mechanism,
wherein the stuck mechanism indicator module indicates that the VVL mechanism is stuck in the one of the high and low lift modes when a change in the COV after the transition is less than a predetermined amount.

5. The system of claim 4 further comprising a remedial action module that, in response to the indication that the VVL mechanism is stuck, at least one of limits an engine speed, commands operation of the VVL mechanism in a default mode, and illuminates an indicator lamp.

6. The system of claim 5 wherein the default mode is the high lift mode.

7. The system of claim 4 wherein the stuck mechanism indicator module indicates that the VVL mechanism is stuck in the one of the high and low lift modes based on the COV a predetermined number combustion cycles of the cylinder after the transition,
wherein the IMEP determination module determines IMEPs for the predetermined number of combustion cycles, respectively, and
wherein the COV determination module determines the COV based on the IMEPs.

8. The system of claim 2 further comprising a transition detection module that selectively indicates that a transition from a high lift mode to a low lift mode has been commanded for the VVL mechanism,
wherein the stuck mechanism indicator module indicates that the VVL mechanism is stuck in the high lift mode when the COV fails to decrease by at least a predetermined amount after the transition.

9. The system of claim 2 further comprising a transition detection module that selectively indicates that a transition from a low lift mode to a high lift mode has been commanded for the VVL mechanism,
wherein the stuck mechanism indicator module indicates that the VVL mechanism is stuck in the low lift mode when the COV fails to increase by at least a predetermined amount after the transition.

10. The system of claim 1 further comprising an indicated work determination module that determines an indicated work of the combustion cycle of the cylinder based on the squares of the first and second ones of the engine speeds during the combustion cycle,
wherein the IMEP determination module determines the IMEP of the combustion cycle as a function of the indicated work and a displacement volume of the engine.

11. A method for a vehicle, comprising:
generating engine speeds based on positions of teeth of a toothed wheel that rotates with a crankshaft and based on a crankshaft position signal generated by a crankshaft position sensor;
determining an indicated mean effective pressure (IMEP) for a combustion cycle of a cylinder of an engine based on squares of first and second ones of the engine speeds during the combustion cycle; and
selectively diagnosing a fault in a variable valve lift (VVL) mechanism of the cylinder based on the IMEP.

12. The method of claim 11 further comprising:
determining a coefficient of variation (COV) for the cylinder based on the IMEP; and
selectively diagnosing the fault in the VVL mechanism based on the COV.

13. The method of claim 12 further comprising selectively diagnosing the fault in the VVL mechanism based on a change in the COV.

14. The method of claim 12 further comprising:
selectively indicating that a transition from one of a high lift mode and a low lift mode to another one of the high and low lift modes has been commanded for the VVL mechanism; and
indicating that the VVL mechanism is stuck in the one of the high and low lift modes when a change in the COV after the transition is less than a predetermined amount.

15. The method of claim 14 further comprising, in response to the indication that the VVL mechanism is stuck, at least one of:
limiting an engine speed;
commanding operation of the VVL mechanism in a default mode; and
illuminating an indicator lamp.

16. The method of claim 15 wherein the default mode is the high lift mode.

17. The method of claim 14 further comprising:
indicating that the VVL mechanism is stuck in the one of the high and low lift modes based on the COV a predetermined number combustion cycles of the cylinder after the transition;
determining IMEPs for the predetermined number of combustion cycles, respectively; and
determining the COV based on the IMEPs.

18. The method of claim 12 further comprising:
selectively indicating that a transition from a high lift mode to a low lift mode has been commanded for the VVL mechanism; and
indicating that the VVL mechanism is stuck in the high lift mode when the COV fails to decrease by at least a predetermined amount after the transition.

19. The method of claim 12 further comprising:
selectively indicating that a transition from a low lift mode to a high lift mode has been commanded for the VVL mechanism; and indicating that the VVL mechanism is stuck in the low lift mode when the COV fails to increase by at least a predetermined amount after the transition.

20. The method of claim 11 further comprising:

determining an indicated work of the combustion cycle of the cylinder based on the squares of the first and second ones of the engine speeds during the combustion cycle; and determining the IMEP of the combustion cycle as a function of the indicated work and a displacement volume of the engine.

\* \* \* \* \*